United States Patent
Kovacs

(10) Patent No.: US 11,379,471 B1
(45) Date of Patent: Jul. 5, 2022

(54) HIERARCHICAL DATASTORE FOR AN AGENT

(71) Applicant: Apple Inc., Cupertino, CA (US)

(72) Inventor: Daniel Laszlo Kovacs, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 98 days.

(21) Appl. No.: 16/998,252

(22) Filed: Aug. 20, 2020

Related U.S. Application Data

(60) Provisional application No. 62/906,661, filed on Sep. 26, 2019.

(51) Int. Cl.
*G06F 16/23* (2019.01)
*G06F 16/245* (2019.01)
*G06F 16/28* (2019.01)

(52) U.S. Cl.
CPC ........ *G06F 16/2379* (2019.01); *G06F 16/245* (2019.01); *G06F 16/282* (2019.01)

(58) Field of Classification Search
CPC .... G06F 16/122; G06F 16/125; G06F 16/185; G06F 16/2379; G06F 16/245; G06F 16/282; G06F 3/0649
See application file for complete search history.

(56) References Cited

U.S. PATENT DOCUMENTS

| | | | | |
|---|---|---|---|---|
| 7,693,877 B1* | 4/2010 | Zasman | ................ | G06F 16/185 707/707 |
| 2006/0004820 A1* | 1/2006 | Claudatos | .............. | G06Q 10/10 |
| 2013/0238575 A1* | 9/2013 | Amarendran | ........... | G06F 16/21 707/694 |
| 2019/0197402 A1* | 6/2019 | Kovács | .................... | G06N 3/04 |

FOREIGN PATENT DOCUMENTS

| | | | | |
|---|---|---|---|---|
| CN | 103793479 A | * | 5/2014 | ....... G06F 17/30289 |
| CN | 107580060 B | * | 10/2020 | |
| WO | WO-0122370 A1 | * | 3/2001 | ............. G06T 13/00 |

OTHER PUBLICATIONS

Ben Goertzel et al., "OpenCogBot: Achieving Generally Intelligent Virtual Agent Control and Humanoid Robotics via Cognitive Synergy", Proceedings of ICAI, vol. 10, 2010, pp. 1-12.

* cited by examiner

*Primary Examiner* — James E Richardson
(74) *Attorney, Agent, or Firm* — Fernando & Partners, LLP

(57) ABSTRACT

A method includes maintaining a hierarchical datastore for an agent instantiated in a computer-generated reality (CGR) environment. The hierarchical datastore includes a first storage hierarchy associated with a first data type and a second storage hierarchy associated with a second data type. The method includes detecting a sensory input that includes sensory input data. The method includes determining a type of the sensory input data. The method includes, in response to the sensory input data being of the first data type, storing the sensory input data in the first storage hierarchy for a first amount of time associated with the first storage hierarchy. The method includes, in response to the sensory input data being of the second data type, storing the sensory input data in the second storage hierarchy for a second amount of time that is different from the first amount of time.

19 Claims, 12 Drawing Sheets

HIERARCHICAL DATASTORE FOR AN AGENT

CROSS-REFERENCE TO RELATED APPLICATION

This application claims the benefit of U.S. Provisional Patent App. No. 62/906,661, filed on Sep. 26, 2019, which is incorporated by reference in its entirety.

TECHNICAL FIELD

The present disclosure generally relates to a hierarchical datastore for an agent.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
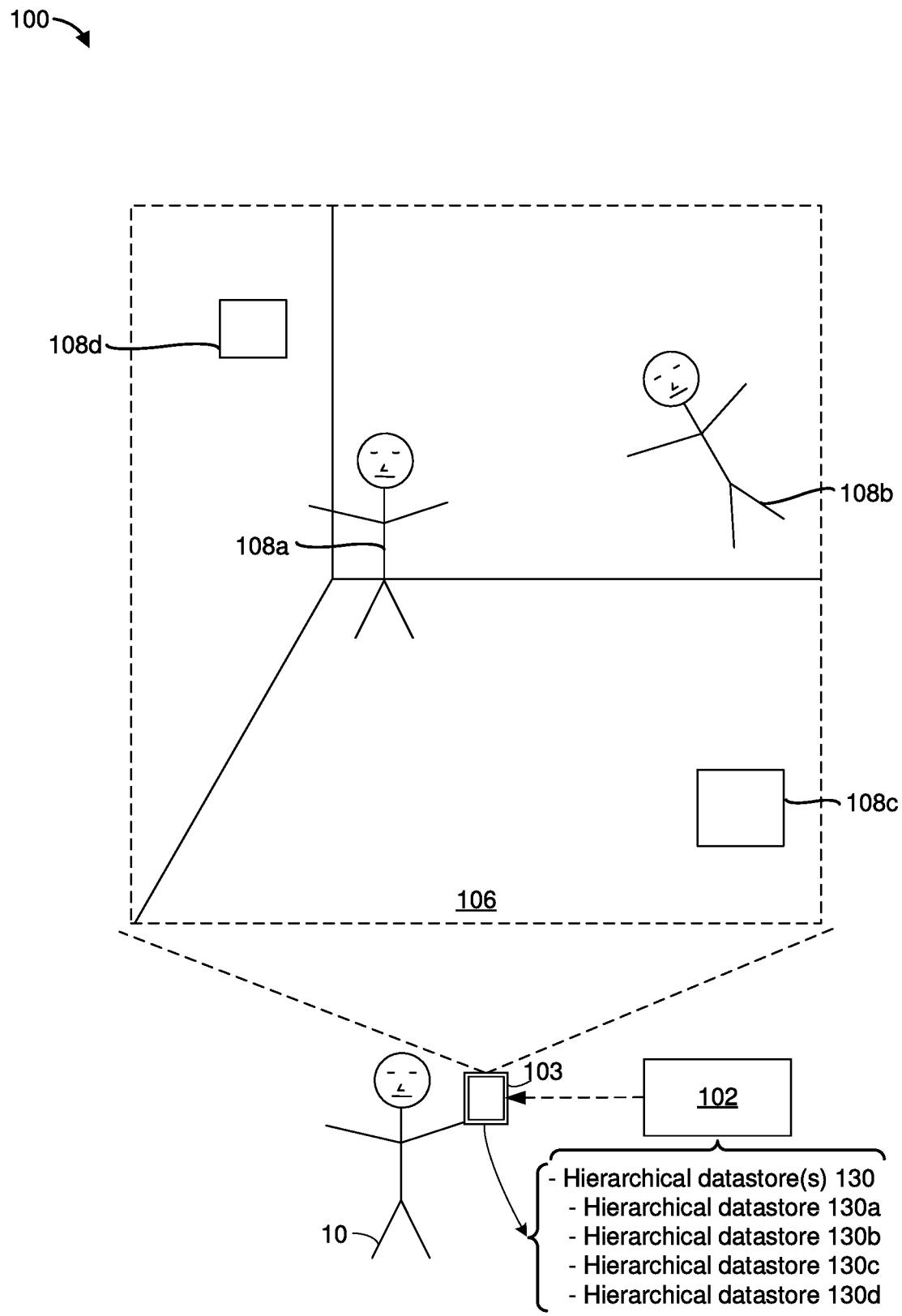
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for maintaining and controlling a hierarchical datastore. In various implementations, a device includes a non-transitory memory, a sensor and one or more processors coupled with the non-transitory memory and the sensor. In some implementations, a method includes maintaining a hierarchical datastore for an agent instantiated in a computer-generated reality (CGR) environment. In some implementations, the hierarchical datastore includes a plurality of storage hierarchies including a first storage hierarchy associated with a first data type and a second storage hierarchy associated with a second data type. In some implementations, the method includes detecting, by a CGR representation of the agent, a sensory input that includes sensory input data. In some implementations, the method includes determining a type of the sensory input data. In some implementations, the method includes, in response to the sensory input data being of the first data type, storing the sensory input data in the first storage hierarchy for a first amount of time associated with the first storage hierarchy. In some implementations, the method includes, in response to the sensory input data being of the second data type, storing the sensory input data in the second storage hierarchy for a second amount of time that is different from the first amount of time. In some implementations, storing the sensory input data in different storage hierarchies based on the data type satisfies a resource utilization threshold.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a device directs a CGR representation of an agent to perform one or more actions in order to effectuate (e.g., advance, satisfy, complete and/or achieve) one or more objectives (e.g., results and/or goals). In some implementations, the agent is associated with a particular objective, and the CGR representation of the agent performs actions that improve the likelihood of effectuating that particular objective. In some implementations, the CGR representation of the agent corresponds to a CGR affordance. In some implementations, the CGR representation of the agent is referred to as a CGR object. In some implementations, the agent is referred to as a virtual intelligent agent (VIA) or an intelligent agent.

In some implementations, a CGR representation of the agent performs a sequence of actions. In some implementations, a device determines (e.g., generates and/or synthesizes) the actions for the agent. In some implementations, the actions generated for the agent are within a degree of similarity to actions that a corresponding entity (e.g., a character, an equipment and/or a thing) performs as described in fictional material or as exists in a physical environment. For example, in some implementations, a CGR representation of an agent that corresponds to a fictional action figure performs the action of flying in a CGR environment because the corresponding fictional action figure flies as described in the fictional material. Similarly, in some implementations, a CGR representation of an agent that corresponds to a physical drone performs the action of hovering in a CGR environment because the corresponding physical drone hovers in a physical environment. In some implementations, the device obtains the actions for the agent. For example, in some implementations, the device receives the actions for the agent from a separate device (e.g., a remote server) that determines the actions.

In some implementations, an agent corresponding to a character is referred to as a character agent, an objective of the character agent is referred to as a character objective, and a CGR representation of the character agent is referred to as a CGR character or a virtual character. In some implementations, the CGR character performs actions in order to effectuate the character objective.

In some implementations, an agent corresponding to equipment (e.g., a rope for climbing, an airplane for flying, a pair of scissors for cutting) is referred to as an equipment agent, an objective of the equipment agent is referred to as an equipment objective, and a CGR representation of the equipment agent is referred to as a CGR equipment. In some implementations, the CGR equipment performs actions in order to effectuate the equipment objective.

In some implementations, an agent corresponding to an environment (e.g., weather pattern, features of nature and/or gravity level) is referred to as an environmental agent, and an objective of the environmental agent is referred to as an environmental objective. In some implementations, the environmental agent configures an environment of the CGR environment in order to effectuate the environmental objective.

As an agent acquires information regarding a CGR environment, the information is stored in a memory that the agent can later access. Traditionally, the information is stored in a flat memory structure which treats all information as equal. However, not all information is equal. For example, one portion of the information may be more important than another portion. One portion of the information may be dependent on another portion. For example, knowledge regarding the passcode to open a door lock depends on knowing a location of the door. In a flat memory structure, the agent may need to utilize computing resources to determine how different portions of the information are related to each other, and store these relationships which occupies more storage space.

The present disclosure provides methods, systems, and/or devices for storing information acquired by an agent in a hierarchical datastore. The hierarchical datastore includes various storage hierarchies which indicate the relationships between different portions of the stored information. Since the hierarchical datastore indicates the relationships between different portions of the stored information, the agent may not need to utilize computing resources to determine the relationships between different portions of the stored information. Also, the agent may not need to utilize storage space to store the relationships between different portions of the stored information.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated reality (CGR) environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from a physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of agents, such as a boy action figure representation 108a, a girl action figure representation 108b, a robot representation 108c, and a drone representation 108d. In some implementations, the agents represent and model the behavior of characters from fictional materials, such as movies, video games, comics, and novels. For example, the boy action figure representation 108a represents and models the behavior of a 'boy action figure' character from a fictional comic, and the girl action figure representation 108b represents and models the behavior of a 'girl action figure' character from a fictional video game. In some implementations, the CGR environment 106 includes agents that represent characters from different fictional materials (e.g., from different movies/games/comics/novels). In various implementations, the agents represent and model the behavior of physical entities (e.g., tangible objects). For example, in some implementations, the agents represent and model the behavior of equipment (e.g., machinery such as planes, tanks, robots, cars, etc.). In the example of FIG. 1, the robot representation 108c represents and models the behavior of a robot and the drone representation 108d represents and models the behavior of a drone. In some implementations, the agents represent and model the behavior of entities (e.g., equipment or characters) from fictional materials. In some implementations, the agents represent and model the behavior of entities from a physical environment, including entities located inside and/or outside of the CGR environment 106.

In various implementations, a CGR representation of an agent performs one or more actions in order to effectuate (e.g., advance, complete, satisfy or achieve) one or more objectives of the agent. In some implementations, the CGR representation of the agent performs a sequence of actions. In some implementations, the controller 102 and/or the electronic device 103 determine the actions that the CGR representation of an agent performs. In some implementations, the actions of a CGR representation of an agent are within a degree of similarity to (e.g., within a similarity threshold of) actions that the corresponding entity (e.g., character, equipment or thing) performs in the fictional material. In the example of FIG. 1, the girl action figure representation 108b is performing the action of flying (e.g., because the corresponding 'girl action figure' character is capable of flying, and/or the 'girl action figure' character frequently flies in the fictional materials). In the example of FIG. 1, the drone representation 108d is performing the action of hovering (e.g., because drones in physical environments are capable of hovering). In some implementations, the controller 102 and/or the electronic device 103 obtain the actions for the agents. For example, in some implementations, the controller 102 and/or the electronic device 103 receive the actions for the agents from a remote server that determines (e.g., selects) the actions. In some implementations, a CGR representation of an agent is referred to as a CGR object, a virtual object or a graphical object.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 determine (e.g., generate) actions for the agents based on a user input from the user 10. For example, in some implementations, the electronic device 103 receives a user input indicating placement of the CGR representations of the agents. In such implementations, the controller 102 and/or the electronic device 103 position the CGR representations of the agents in accordance with the placement indicated by the user input. In some implementations, the user input indicates specific actions that the agents are permitted to perform. In such implementations, the controller 102 and/or the electronic device 103 select the actions for the agents from the specific actions indicated by the user input. In some implementations, the controller 102 and/or the electronic device 103 forgo actions that are not among the specific actions indicated by the user input.

In some implementations, the controller 102 and/or the electronic device 103 store one or more hierarchical datastores 130 ("hierarchical datastore 130", hereinafter for the sake of brevity). In some implementations, the hierarchical datastore 130 includes various storage hierarchies that are associated with corresponding data types. When a CGR representation of an agent acquires data of a particular data type, the hierarchical datastore 130 stores the acquired data in a storage hierarchy that is associated with that particular data type.

In some implementations, the same hierarchical datastore 130 stores data for multiple agents (e.g., for all agents). Alternatively, in some implementations, each agent is associated with a corresponding hierarchical datastore. For example, in some implementations, a boy hierarchical datastore 130a stores data acquired by the boy action figure representation 108a, a girl hierarchical datastore 130b stores data acquired by the girl action figure representation 108b, a robot hierarchical datastore 130c stores data acquired by the robot representation 108c, and a drone hierarchical datastore 130d stores data acquired by the drone representation 108d.

In some implementations, the electronic device 103 is replaced by a head-mountable device (HMD) that is worn by the user 10. In some implementations, the HMD includes a head-mountable enclosure. In some implementations, the head-mountable enclosure is shaped to form a receptacle for receiving an electronic device with a display (e.g., the electronic device 103 shown in FIG. 1). For example, in some implementations, the electronic device 103 shown in FIG. 1 can be slid into the HMD. In some implementations, the HMD includes an integrated display for presenting a CGR experience to the user 10. In some implementations, the controller 102 and/or the HMD store the hierarchical datastore(s) 130.

Figure 2:
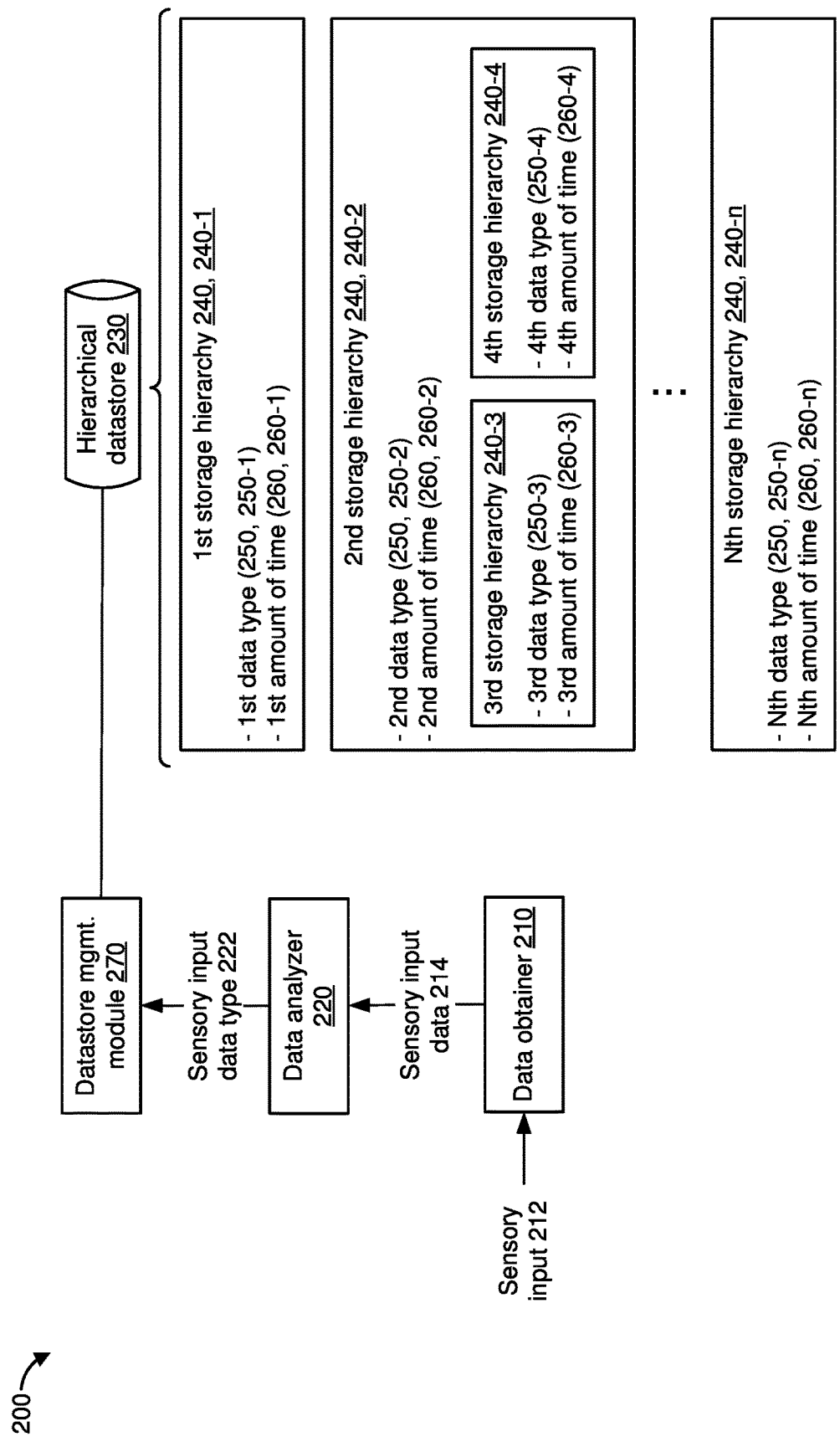
FIG. 2 is a block diagram of an example system for controlling a hierarchical datastore in accordance with some implementations.

FIG. 2 is a block diagram of an example system 200 for maintaining and controlling a hierarchical datastore for an agent. In some implementations, the system 200 resides at the controller 102 and/or the electronic device 103 shown in FIG. 1. In various implementations, the system 200 includes a data obtainer 210, a data analyzer 220, a hierarchical datastore 230 with various storage hierarchies 240, and a datastore management module 270. In some implementations, the hierarchical datastore 230 implements the hierarchical datastore(s) 130 shown in FIG. 1. In some implementations, a first instance of the hierarchical datastore 230 implements the boy hierarchical datastore 130a, a second instance of the hierarchical datastore 230 implements the girl hierarchical datastore 130b, a third instance of the hierarchical datastore 230 implements the robot hierarchical datastore 130c, and a fourth instance of the hierarchical datastore 230 implements the drone hierarchical datastore 130d.

In various implementations, the hierarchical datastore 230 includes various storage hierarchies 240. In the example of FIG. 2, the hierarchical datastore 230 includes a first storage hierarchy 240-1, a second storage hierarchy 240-2, a third storage hierarchy 240-3, a fourth storage hierarchy 240-2, . . . , and an nth storage hierarchy 240-n. In various implementations, each storage hierarchy 240 is associated with a particular data type 250. For example, the first storage hierarchy 240-1 is associated with a first data type 250-1, the second storage hierarchy 240-2 is associated with a second data type 250-2, the third storage hierarchy 240-3 is associated with a third data type 250-3, the fourth storage hierarchy 240-4 is associated with a fourth data type 250-4, . . . , and the nth storage hierarchy 240-n is associated with an nth data type 250-n. Each storage hierarchy 240 stores data of the data type 250 associated with the storage hierarchy 240. For example, the first storage hierarchy 240-1 stores data of the first data type 250-1, the second storage hierarchy 240-2 stores data of the second data type 250-2, the third storage hierarchy 240-3 stores data of the third data type 250-3, the fourth storage hierarchy 2404 stores data of the fourth data type 250-4, . . . , and the nth storage hierarchy stores data of the nth data type 250-n.

In various implementations, each storage hierarchy 240 is associated with a respective amount of time 260. For example, the first storage hierarchy 240-1 is associated with a first amount of time 260-1, the second storage hierarchy 240-2 is associated with a second amount of time 260-2, the third storage hierarchy 240-3 is associated with a third amount of time 260-3, the fourth storage hierarchy 240-4 is associated with a fourth amount of time 260-4, . . . , and the nth storage hierarchy 240-n is associated with an nth amount of time 260-n.

In various implementations, each storage hierarchy 240 stores data in the storage hierarchy 240 for the amount of time 260 associated with the storage hierarchy 240. For example, the first storage hierarchy 240-1 stores data in the first storage hierarchy 240-1 for the first amount of time 260-1, the second storage hierarchy 240-2 stores data in the second storage hierarchy 240-2 for the second amount of time 260-2, the third storage hierarchy 240-3 stores data in the third storage hierarchy 240-3 for the third amount of time 260-3, the fourth storage hierarchy 240-4 stores data in the fourth storage hierarchy 240-4 for the fourth amount of time 260-4, . . . , and the nth storage hierarchy 240-n stores data in the nth storage hierarchy 240n for the nth amount of time 260-n.

After a storage hierarchy 240 has stored a particular datum in the storage hierarchy 240 for the amount of time 260 associated with the storage hierarchy 240, the storage hierarchy 240 purges that particular datum from the storage hierarchy 240. For example, after the first storage hierarchy 240-1 has stored a particular datum in the first storage hierarchy 240-1 for the first amount of time 260-1, the first storage hierarchy 240-1 purges that particular datum from the first storage hierarchy 240-1. Similarly, after the fourth storage hierarchy 240-4 has stored a particular datum in the fourth storage hierarchy 240-2 for the fourth amount of time 260-4, the fourth storage hierarchy 240-4 purges that particular datum from the fourth storage hierarchy 240-4.

In some implementations, some of the storage hierarchies 240 are nested within another storage hierarchy. In the example of FIG. 2, the third storage hierarchy 240-3 and the fourth storage hierarchy 240-4 are nested within the second storage hierarchy 240-2. In some implementations, the third data type 250-3 and the fourth data type 250-4 are subtypes of the second data type 250-2. In some implementations, the third amount of time 260-3 and the fourth amount of time 260-4 are the same as the second amount of time 260-2. More generally, in various implementations, storage characteristics of a child storage hierarchy are similar to (e.g., same as) storage characteristics of a parent storage hierarchy within which the child storage hierarchy is nested.

In various implementations, the data obtainer 210 obtains a sensory input 212 that includes sensory input data 214. In some implementations, the data obtainer 210 includes a sensor (e.g., a physical sensor and/or a virtual sensor), and the sensory input 212 includes a sensor measurement captured by the sensor. In some implementations, the data obtainer 210 includes a physical sensor that captures a sensor measurement which indicates a condition of a physical environment (e.g., a physical environment surrounding the electronic device 103). In some implementations, the data obtainer 210 includes a virtual sensor that captures a sensor measurement which indicates a condition of a CGR environment (e.g., the CGR environment 106 shown in FIG. 1). In some implementations, the sensory input data 214 includes information obtained (e.g., detected and/or acquired) by a CGR representation of an agent (e.g., by the boy action figure representation 108a, the girl action figure representation 108b, the robot representation 108c and/or the drone representation 108d). In some implementations, the data obtainer 210 receives the sensory input 212 from another device.

In some implementations, the data analyzer 220 analyzes the sensory input data 214 in order to determine a sensory input data type 222. In some implementations, the data analyzer 220 determines the sensory input data type 222 by categorizing the sensory input data 214 into one of the data types 250. As such, in some implementations, the sensory input data type 222 corresponds to one of the data types 250. In some implementations, the data analyzer 220 utilizes a machine-learned classifier to classify the sensory input data 214 into one of the data types 250. In some implementations, the data analyzer 220 determines the sensory input data type 222 by comparing the sensory input data 214 with data stored in each of the storage hierarchies 240, and selecting the data type 250 of the storage hierarchy 240 which stores data that is most similar to the sensory input data 214. For example, the data analyzer 220 determines respective similarity scores for the storage hierarchies 240, and selects the data type 250 of the storage hierarchy 240 with the highest similarity score.

In various implementations, the datastore management module 270 manages the hierarchical datastore 230. For example, in some implementations, the datastore management module 270 controls the flow of data into and/or out of the hierarchical datastore 230. In some implementations, the datastore management module 270 performs write operations and/or read operations with respect to the hierarchical datastore 230. In some implementations, the datastore management module 270 receives an indication of the sensory input data type 222 from the data analyzer 220. The datastore management module 270 stores the sensory input data 214 in a storage hierarchy 240 that is associated with a data type 250 that matches the sensory input data type 222.

FIGS. 3A-3F are block diagrams of a system 300 that includes an example hierarchical datastore 310. In some implementations, the hierarchical datastore 310 implements the hierarchical datastore(s) 130 shown in FIG. 1 and/or the hierarchical datastore 230 shown in FIG. 2. In various implementations, the hierarchical datastore 310 includes various storage hierarchies. For example, the hierarchical datastore 310 includes a sensory storage hierarchy 320 ("sensory storage 320", hereinafter for the sake of brevity), a short-term storage hierarchy 330 ("short-term storage 330", hereinafter for the sake of brevity), and a long-term storage hierarchy 340 ("long-term storage 340", hereinafter for the sake of brevity). In the example of FIGS. 3A-3F, the long-term storage 340 further includes a declarative storage hierarchy 350 ("declarative storage 350", hereinafter for the sake of brevity) and a procedural storage hierarchy 360 ("procedural storage 360", hereinafter for the sake of brevity). In the example of FIGS. 3A-3F, the declarative storage 350 further includes an episodic storage hierarchy 370 ("episodic storage 370", hereinafter for the sake of brevity) and a semantic storage hierarchy 380 ("semantic storage 380", hereinafter for the sake of brevity). In some implementations, each storage hierarchy includes a datastore. As such, in some implementations, the hierarchical datastore 310 is a collection of datastores that are arranged in a hierarchy.

In some implementations, the sensory storage 320 stores sensory data of a data type 322 for an amount of time 324 (e.g., less than one second). In some implementations, the short-term storage 330 stores short-term data of a data type 332 for an amount of time 334 (e.g., less than one minute). In some implementations, the long-term storage 340 stores long-term data of a data type 342 for an amount of time 344 (e.g., existential period of an agent, for example, lifetime of the agent). In some implementations, the declarative storage 350 stores data of a data type 352 (e.g., data describing facts and events known to the agent) for the amount of time 344 (e.g., the existential period of the agent). In some implementations, the episodic storage 370 stores data of a data type 372 (e.g., data describing events observed by a CGR representation of the agent and/or experiences of the agent) for the amount of time 344 (e.g., the existential period of the agent). In some implementations, the semantic storage 380 stores data of a data type 382 (e.g., data describing facts and/or concepts known to the agent) for the amount of time 344 (e.g., the existential period of the agent). In some implementations, the procedural storage 360 stores data of a data type 362 (e.g., skills that the agent possesses and/or tasks that the agent has performed, is performing or is expected to perform in the future) for the amount of time 344 (e.g., the existential period of the agent).

Figure 3A:
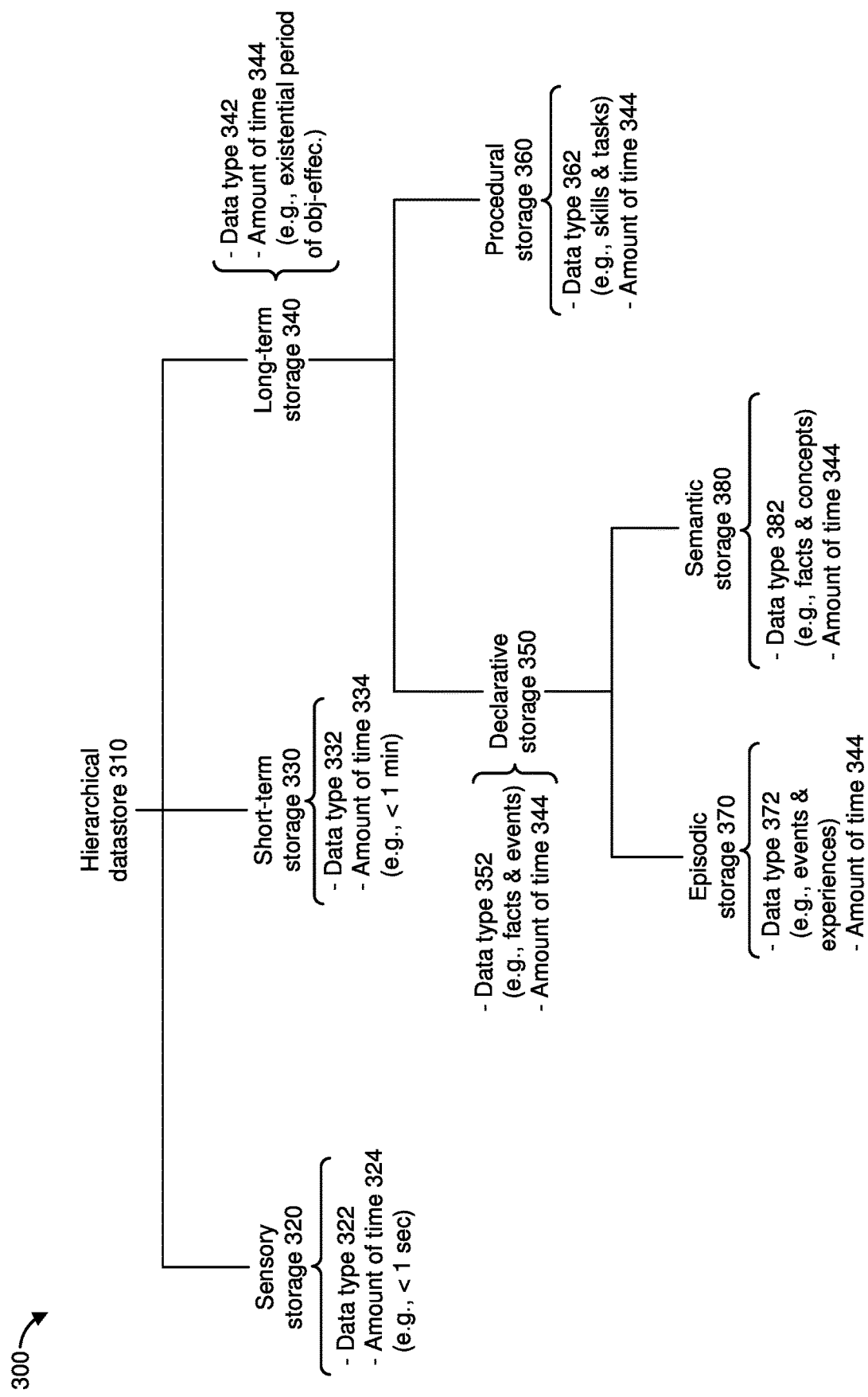
FIGS. 3A-3F are block diagrams of an example hierarchical datastore in accordance with some implementations.
Figure 3B:
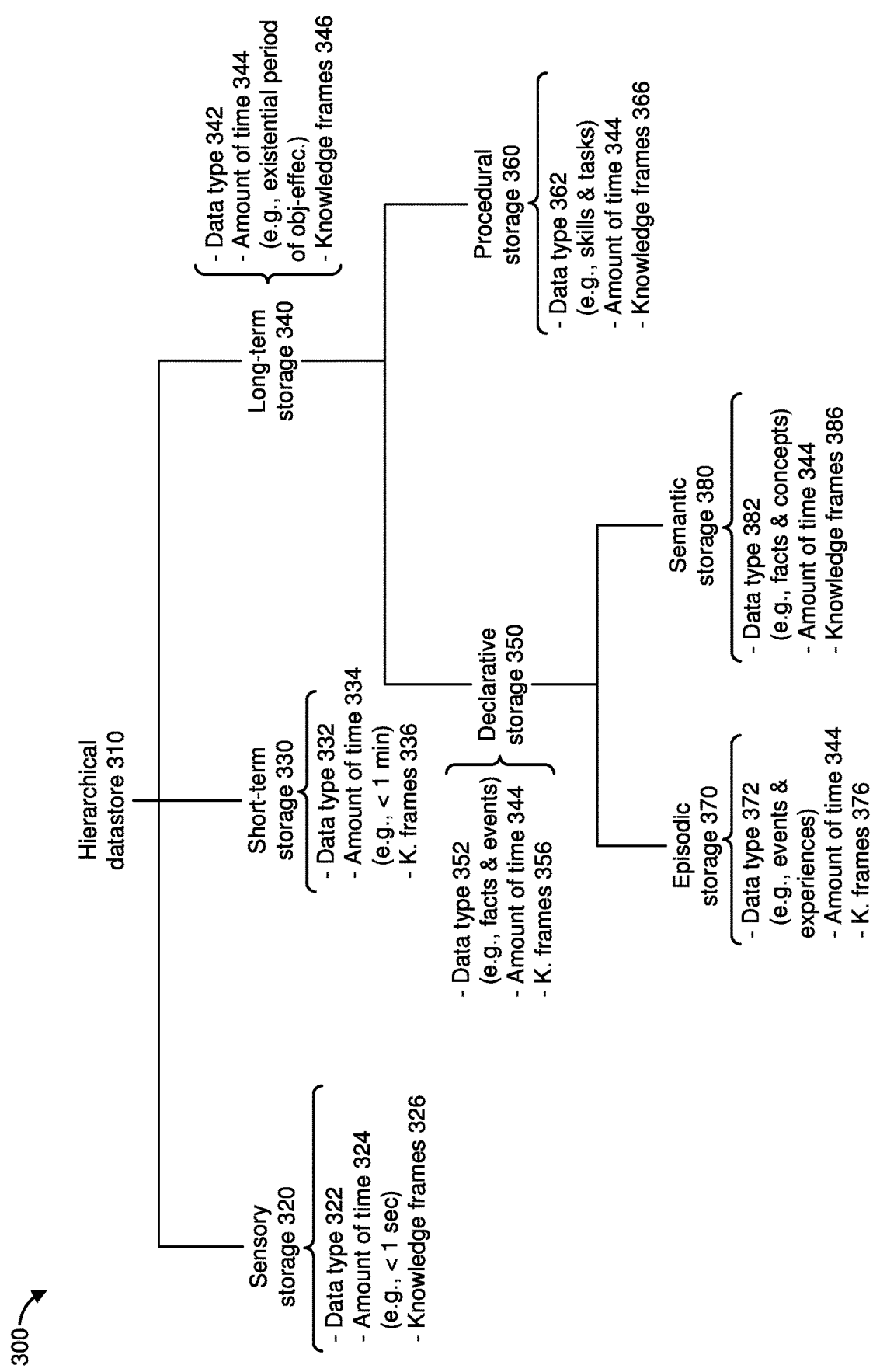

Referring to FIG. 3B, in some implementations, each storage hierarchy stores data in knowledge frames. In some implementations, a knowledge frame includes an artificial intelligence data structure used to divide knowledge into substructures by representing predetermined situations. In the example of FIG. 3B, the sensory storage 320, the short-term storage 330, the long-term storage 340, the declarative storage 350, the procedural storage 360, the episodic storage 370 and the semantic storage 380 include knowledge frames 326, 336, 346, 356, 366, 376 and 386, respectively.

Figure 3C:
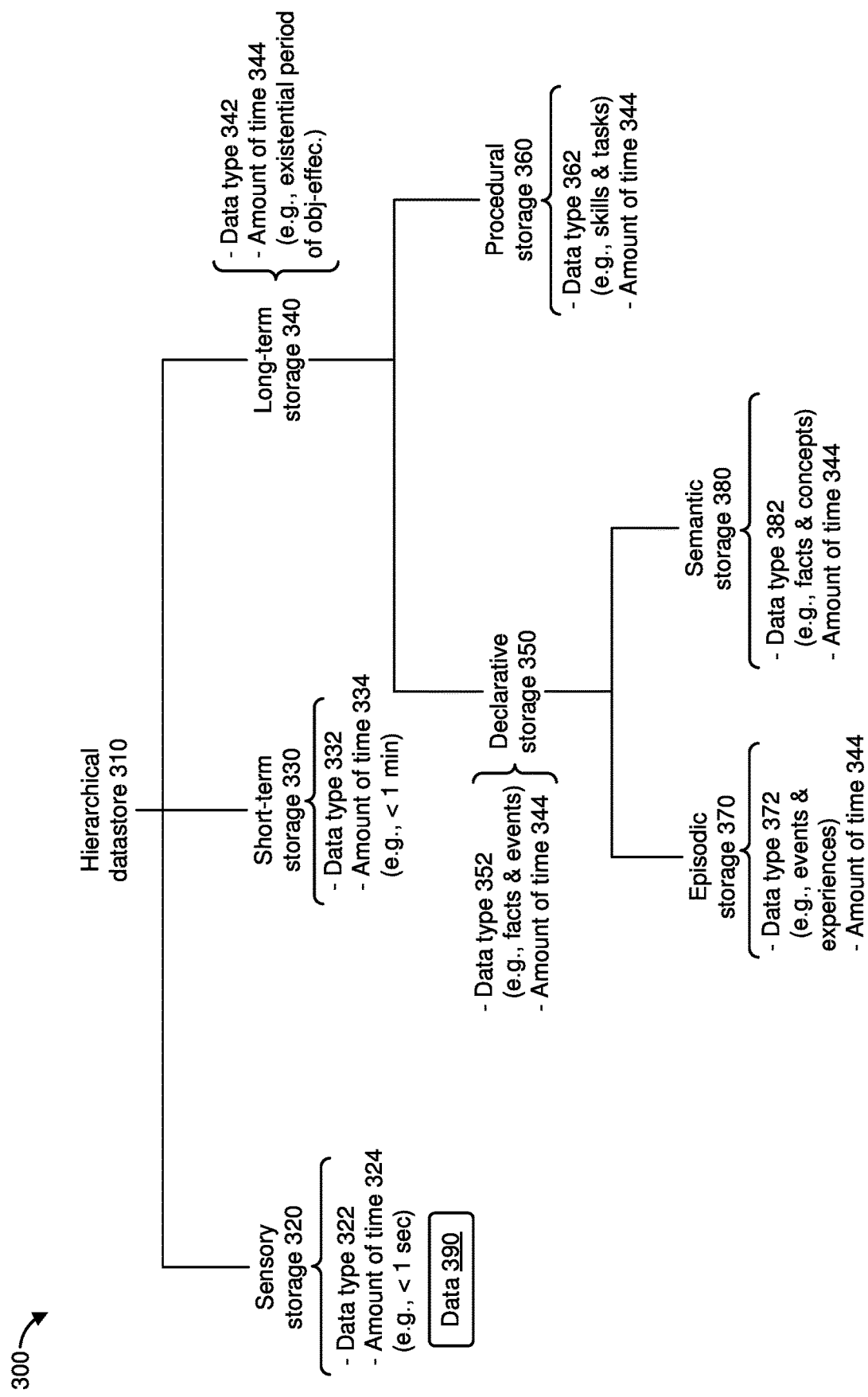
Figure 3D:
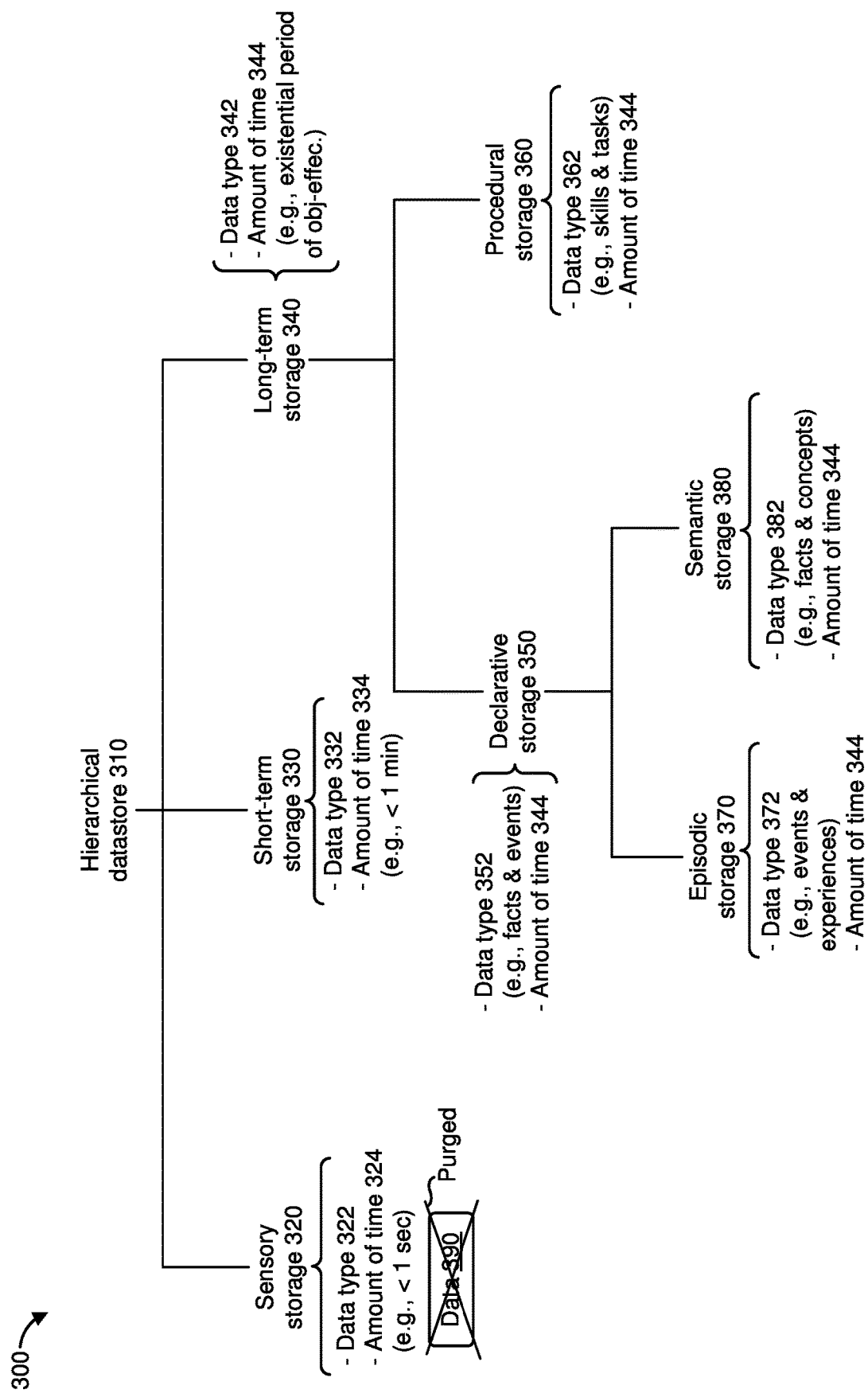

Referring to FIG. 3C, data 390 is stored in the sensory storage 320. As shown in FIG. 3D, the sensory storage 320 purges the data 390 after the data 390 has been stored in the sensory storage 320 for the amount of time 324. More generally, each storage hierarchy purges data that has been stored in the storage hierarchy for an amount of time associated with the storage hierarchy.

Figure 3E:
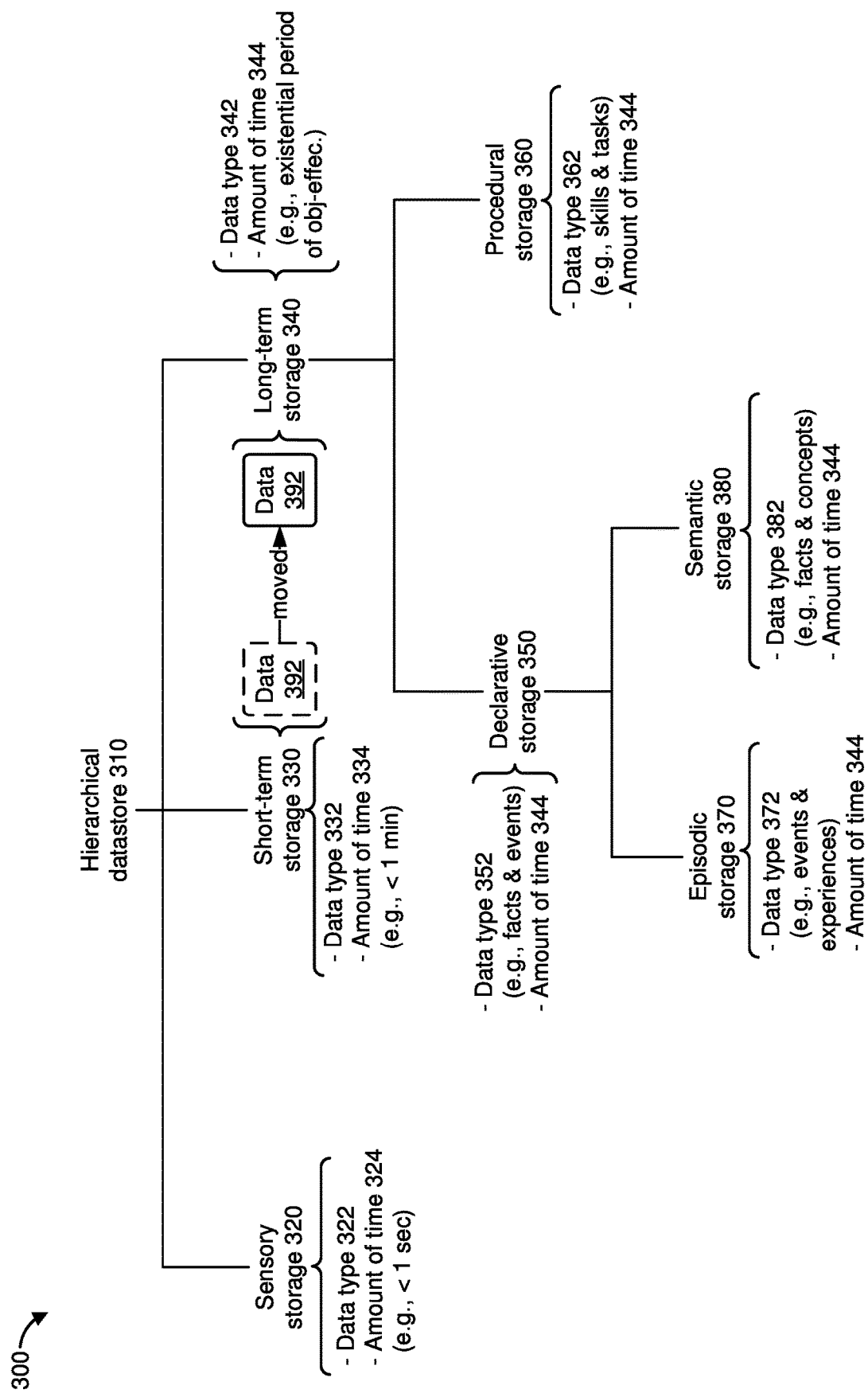

Referring to FIG. 3E, data 392 was initially stored in the short-term storage 330. However, the hierarchical datastore 310 moves the data 392 from the short-term storage 330 to the long-term storage 340. In some implementations, the hierarchical datastore 310 moves the data 392 to the long-term storage 340 after the data 392 has satisfied a move criterion. For example, in some implementations, the hierarchical datastore 310 moves the data 392 after the data 392 has been accessed a threshold number of times.

Figure 3F:
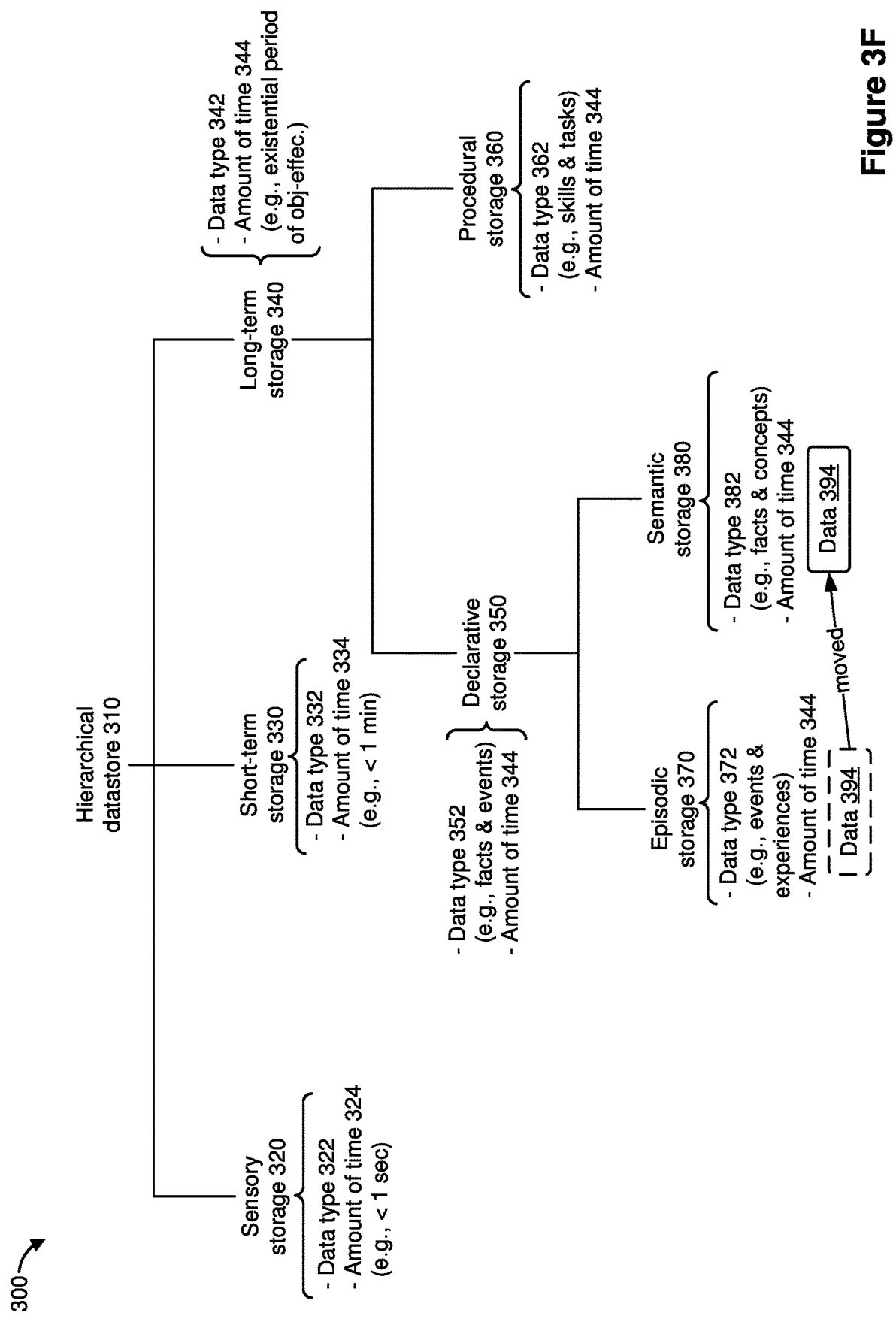

Referring to FIG. 3F, data 394 was initially stored in the episodic storage 370. However, the hierarchical datastore 310 moves the data 394 from the episodic storage 370 to the semantic storage 380. In some implementations, the hierarchical datastore 310 moves the data 394 to the semantic storage 380 after the data 394 has satisfied a move criterion. For example, in some implementations, the data 394 corresponds to an event and the hierarchical datastore 310 moves the data 394 after the event has been confirmed as a fact. More generally, in various implementations, the hierarchical datastore 310 moves data between storage hierarchies in response to the data being transformed from one data type to another data type (e.g., from the data type 372 representing events and experiences to the data type 382 representing facts and concepts).

Figure 4A:
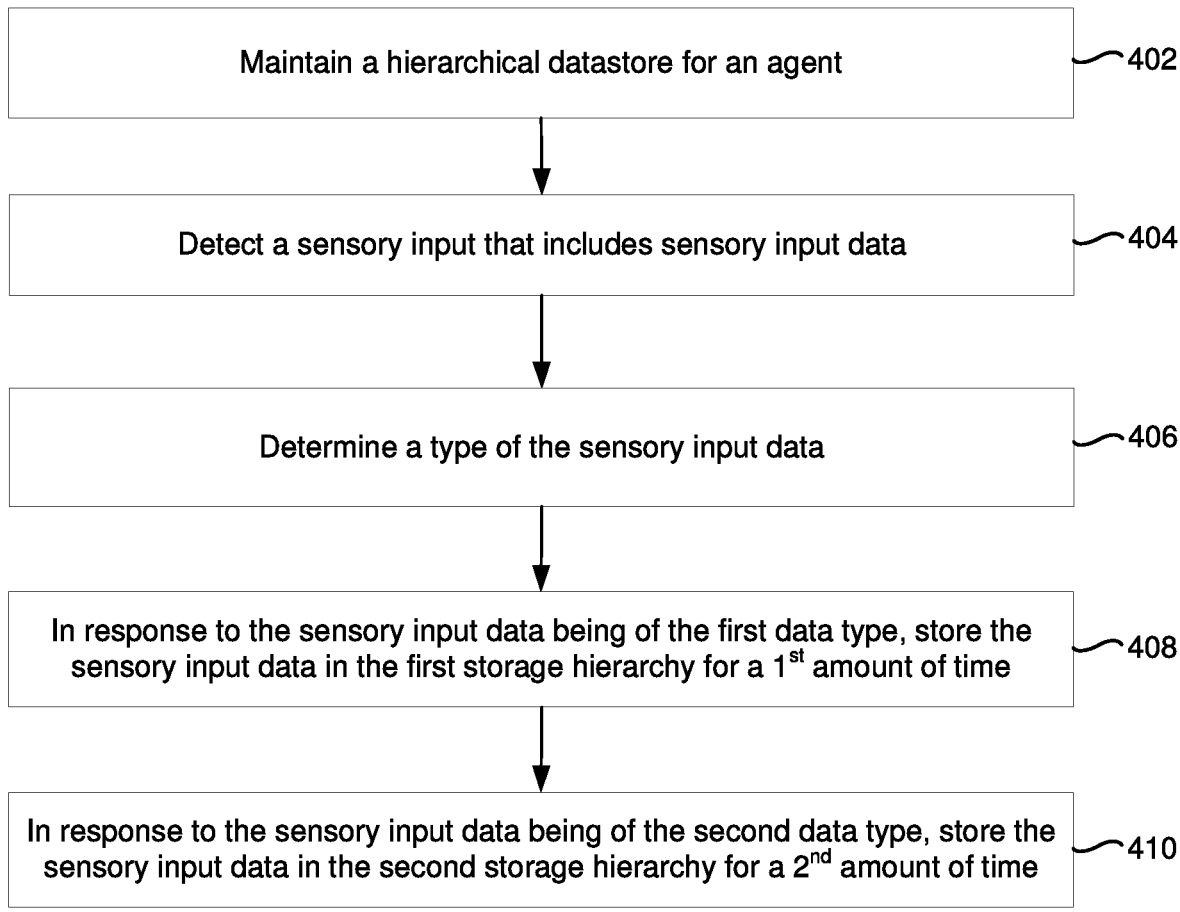
FIGS. 4A-4C are flowchart representations of a method of maintaining and controlling a hierarchical datastore in accordance with some implementations.

FIG. 4A is a flowchart representation of a method 400 of maintaining and controlling a hierarchical datastore (e.g., the hierarchical datastore 130 shown in FIG. 1, the hierarchical datastore 230 shown in FIG. 2 and/or the hierarchical datastore 310 shown in FIGS. 3A-3F). In various implementations, the method 400 is performed by a device with a non-transitory memory, a sensor and one or more processors coupled with the non-transitory memory and the sensor (e.g., the controller 102 and/or the electronic device 103 shown in FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, in various implementations, the method 400 includes maintaining a hierarchical datastore for an agent instantiated in a computer-generated reality (CGR) environment. In some implementations, the hierarchical datastore includes a plurality of storage hierarchies (e.g., hierarchical storage levels) including a first storage hierarchy associated with a first data type and a second storage hierarchy associated with a second data type. For example, maintaining the hierarchical datastore 130 shown in FIG. 1, the hierarchical datastore 230 shown in FIG. 2 and/or the hierarchical datastore 310 shown in FIGS. 3A-3F. In some implementations, the method 400 includes maintaining a separate instance of the hierarchical datastore for each agent instantiated in the CGR environment. Alternatively, in some implementations, the method 400 includes maintaining a single instance of the hierarchical datastore for multiple agents (e.g., all agents) instantiated in the CGR environment. In some implementations, the method 400 includes maintaining a hierarchical datastore for an agent that is not instantiated in the CGR environment (e.g., maintaining a hierarchical datastore for an agent that resides in an agent library).

As represented by block 404, in various implementations, the method 400 includes detecting, by a CGR representation of the agent, a sensory input that includes sensory input data. For example, detecting the sensory input 212 that includes the sensory input data 214 shown in FIG. 2. In some implementations, the method 400 includes receiving the sensory input from a virtual sensor that is deployed in the CGR environment. For example, in some implementations, the sensory input includes an audio input that is detected via ears of the CGR representation of the agent. In some implementations, the sensory input includes an olfactory input (e.g., a smell input) that is detected via a nose of the CGR representation of the agent. In some implementations, the sensory input includes a tactile input (e.g., a touch input) that is detected via a skin of the CGR representation of the agent. In some implementations, the sensory input includes an optical input (e.g., a visual input) that is detected via eyes of the CGR representation of the agent. In some implementations, the method 400 includes receiving the sensory input from a physical sensor that is deployed in a physical environment (e.g., in a physical environment surrounding the device).

As represented by block 406, in some implementations, the method 400 includes determining a type of the sensory input data. For example, the method 400 includes determining the sensory input data type 222 shown in FIG. 2. In some implementations, the method 400 includes utilizing a machine-learned classifier to classify the sensory input data into one of the data types associated with the storage hierarchies. In some implementations, the method 400 includes determining similarity scores indicating degrees of similarities between the sensory input data and respective data stored in the storage hierarchies, and selecting the data type of the storage hierarchy associated with the highest similarity score.

As represented by block 408, in various implementations, the method 400 includes, in response to the sensory input data being of the first data type, storing the sensory input data in the first storage hierarchy for a first amount of time associated with the first storage hierarchy. For example, referring to FIG. 2, if the sensory input data type 222 matches the first data type 250-1, the datastore management module 270 stores the sensory input data 214 in the first storage hierarchy 240-1 for the first amount of time 260-1.

As represented by block 410, in various implementations, the method 400 includes, in response to the sensory input data being of the second data type, storing the sensory input data in the second storage hierarchy for a second amount of time that is different from the first amount of time. For example, referring to FIG. 2, if the sensory input data type 222 matches the second data type 250-2, the datastore management module 270 stores the sensory input data 214 in the second storage hierarchy 240-2 for the second amount of time 260-2. In some implementations, storing the sensory input data in different storage hierarchies based on the data type satisfies a resource utilization threshold (e.g., a storage utilization threshold). For example, in some implementations, storing the sensory input data in different storage hierarchies reduces the need to tag the sensory input data with data types thereby conserving the computing resources that would be utilized in tagging and/or conserving the storage resources that would be utilized in storing the tags. In some implementations, storing the sensory input data in different storage hierarchies reduces the need to determine relationships between different portions of the sensory input data because the hierarchy of the hierarchical datastore indicates the relationship. In some implementations, storing the sensory input data in different storage hierarchies reduces an amount of time required to access the sensory input data because instead of searching the entirety of a flat datastore, the device can search a single storage hierarchy.

Figure 4B:
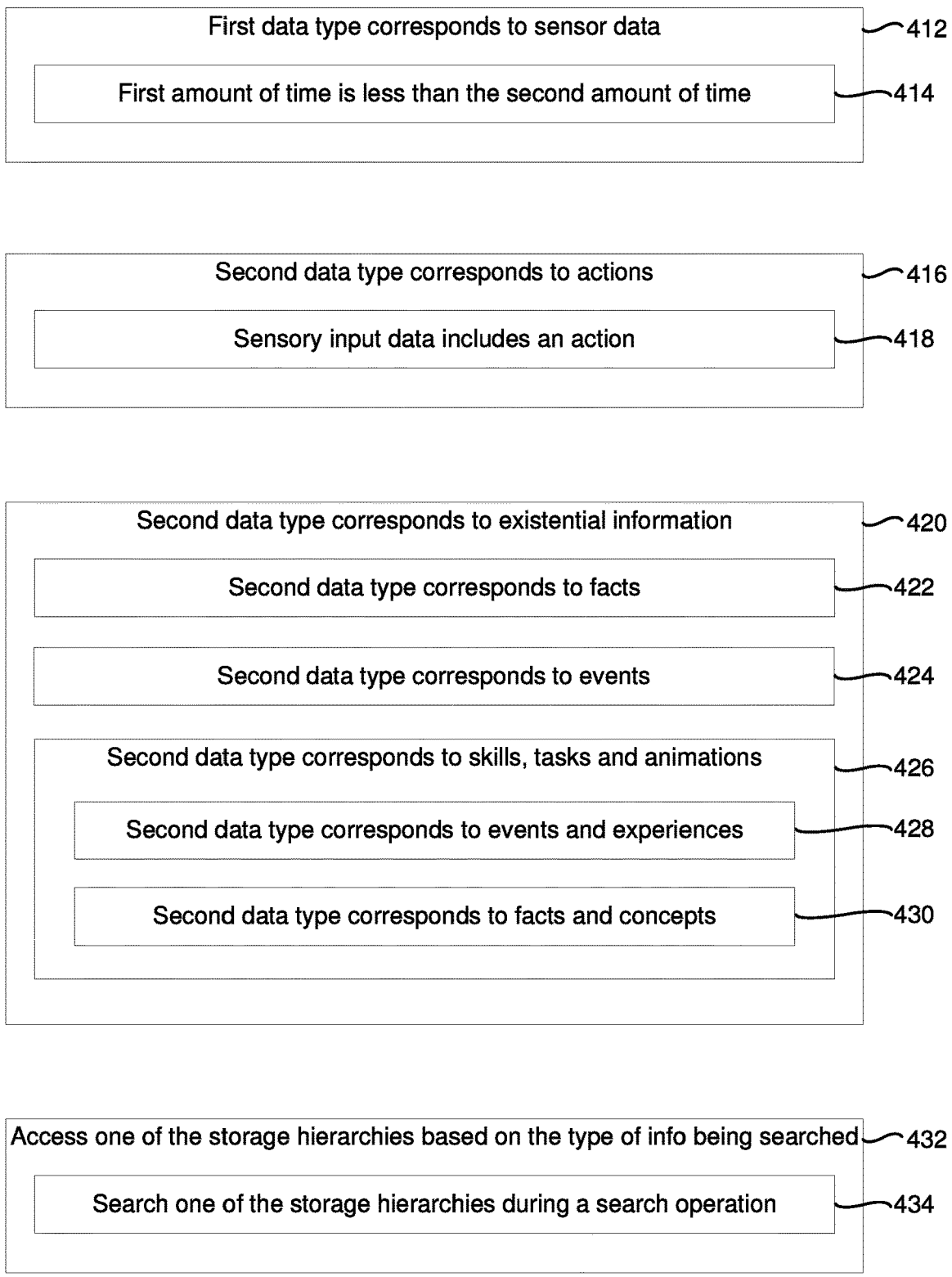

Referring to FIG. 4B, as represented by block 412, in some implementations, the first data type corresponds to sensor data, and the sensory input data is stored in the first storage hierarchy in response to the sensory input data being sensor data. For example, the sensory input data is stored in the sensory storage 320 shown in FIGS. 3A-3F.

As represented by block 414, in some implementations, the first amount of time is less than the second amount of time. For example, referring to FIGS. 3A-3F, the amount of time 324 associated with the sensory storage 320 (e.g., less than one second) is less than the amount of time 334 associated with the short-term storage 330 (e.g., less than one minute).

As represented by block 416, in some implementations, the second data type corresponds to actions, and the sensory input data is stored in the second storage hierarchy in response to the sensory input data being an action that can be performed by the CGR representation of the agent. For example, the sensory input data is stored in the procedural storage 360 shown in FIGS. 3A-3F. As represented by block 418, in some implementations, the sensory input data includes an action that the CGR representation of the agent is scheduled to perform at a future time.

As represented by block 420, in some implementations, the second data type corresponds to information that is associated with the agent while the agent exists in the CGR environment. For example, the second data type corresponds to the data type 342 associated with the long-term storage 340 shown in FIGS. 3A-3F.

As represented by block 422, in some implementations, the second data type corresponds to facts regarding the CGR environment. For example, the second data type corresponds to the data type 352 associated with the declarative storage 350 shown in FIGS. 3A-3F.

As represented by block 424, in some implementations, the second data type corresponds to events that occur in the CGR environment. For example, the second data type corresponds to the data type 352 associated with the declarative storage 350 shown in FIGS. 3A-3F.

As represented by block 426, in some implementations, the second data type corresponds to skills, tasks and/or animations. For example, the second data type corresponds to the data type 362 associated with the procedural storage 360 shown in FIGS. 3A-3F. In some implementations, the method 400 includes storing animations such as a running animation, a jumping animation, etc.

As represented by block 428, in some implementations, the second storage hierarchy stores events and experiences associated with the CGR representation of the agent. For example, the second data type corresponds to the data type 372 associated with the episodic storage 370 shown in FIGS. 3A-3F.

As represented by block 430, in some implementations, the second storage hierarchy stores facts and concepts that are known to the agent. For example, the second data type corresponds to the data type 382 associated with the semantic storage 380 shown in FIGS. 3A-3F.

As represented by block 432, in some implementations, the agent accesses one of the plurality of storage hierarchies based on the data type of the information that the agent is searching. For example, if the agent is searching for a particular skill that the agent possesses, the agent searches the procedural storage 360. As represented by block 434, the agent searches one of the storage hierarchies during a search operation (e.g., instead of searching all the storage hierarchies).

Figure 4C:
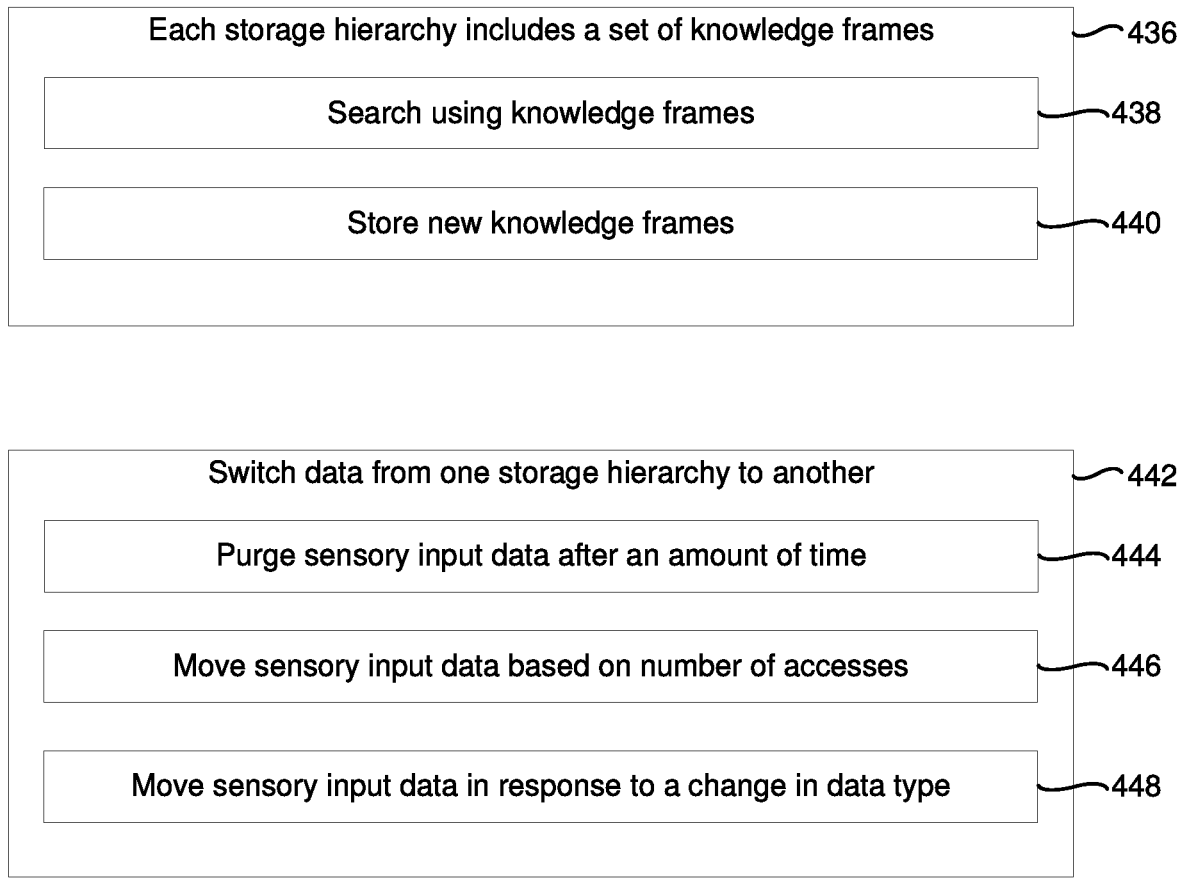

Referring to FIG. 4C, as represented by block 436, in some implementations, each storage hierarchy includes a set of one or more knowledge frames for storing the sensory input data. For example, as shown in FIG. 3B, the sensory storage 320, the short-term storage 330, the long-term storage 340, the declarative storage 350, the procedural storage 360, the episodic storage 370 and the semantic storage 380 include the knowledge frames 326, 336, 346, 356, 366, 376 and 386, respectively.

As represented by block 438, in some implementations, the method 400 includes obtaining a particular knowledge frame, and identifying other knowledge frames that are within a degree of similarity to the particular knowledge frame. In some implementations, the method 400 includes generating similarity scores indicative of respective degrees of similarity between the particular knowledge frame and the other knowledge frames.

As represented by block 440, in some implementations, the method 400 includes obtaining a new knowledge frame, identifying a particular storage hierarchy that stores knowledge frames that are within a degree of similarity to the new knowledge frame, and storing the new knowledge frame in that particular storage hierarchy. In some implementations, the method 400 includes generating similarity scores indicative of respective degrees of similarity between the new knowledge frame and the knowledge frames stored in the storage hierarchies, and selecting the storage hierarchy with the highest similarity score.

As represented by block 442, in some implementations, the method 400 includes removing a portion of the sensory input data stored in the first storage hierarchy. As represented by block 444, in some implementations, the method 400 includes purging the portion of the sensory input data from the first storage hierarchy after the portion of the sensory input data has been stored in the first storage hierarchy for the first amount of time. For example, the method 400 includes purging the data 390 from the sensory storage 320, as shown in FIG. 3D.

As represented by block 446, in some implementations, the method 400 includes moving the portion of the sensory input data from the first storage hierarchy to the second storage hierarchy in response to the agent accessing the portion of the sensory input data a threshold number of times. For example, the method 400 includes moving the data 392 from the short-term storage 330 to the long-term storage 340 after the data 392 has been accessed a threshold number of times, as shown in FIG. 3E.

As represented by block 448, in some implementations, the method 400 includes moving the portion of the sensory input data from the first storage hierarchy to the second storage hierarchy in response to the portion of the sensory input data switching from being the first data type to the second data type. For example, the method 400 includes moving the data 394 from the episodic storage 370 to the semantic storage 380, as shown in FIG. 3F.

Figure 5:
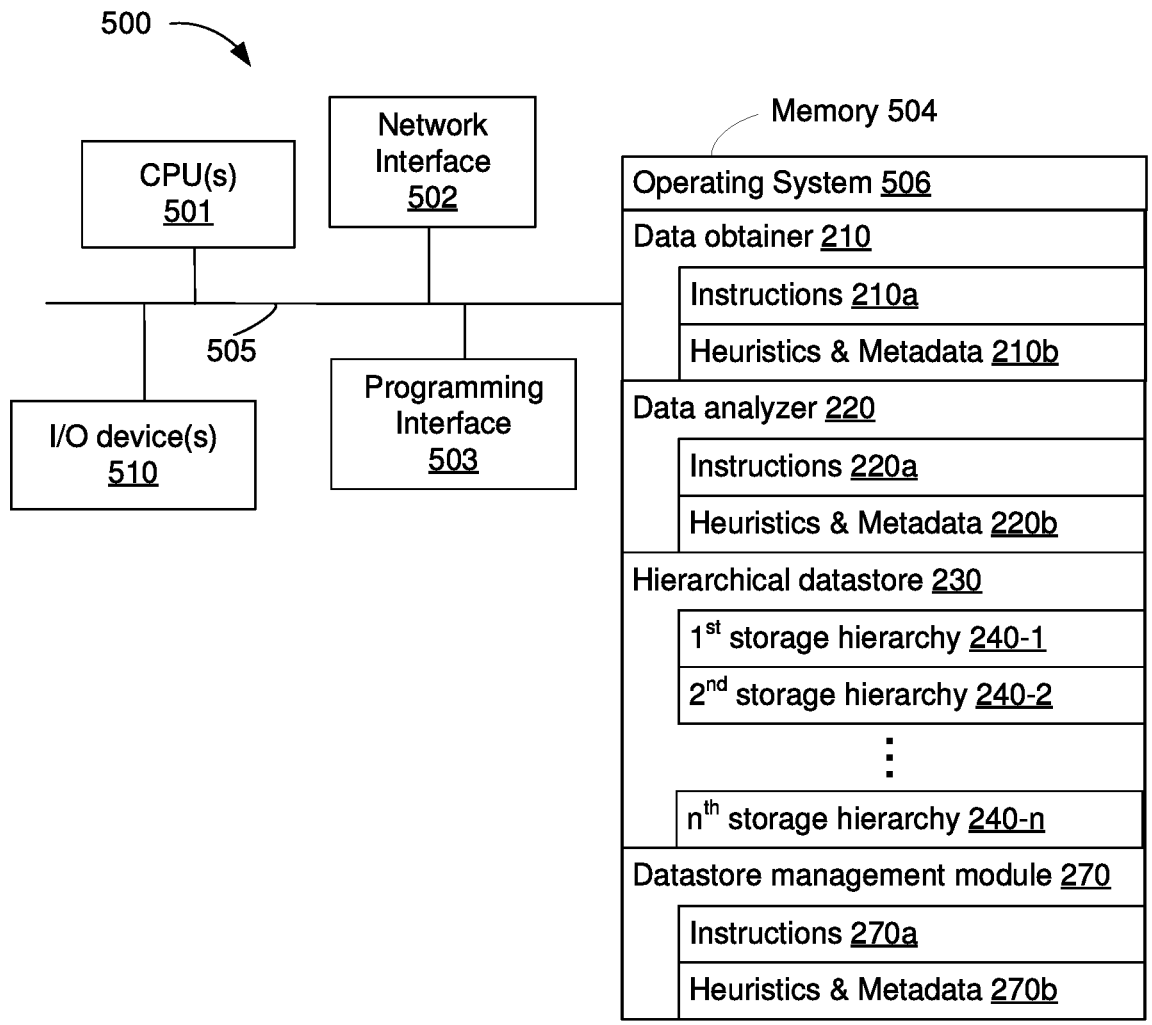
FIG. 5 is a block diagram of a device that maintains and controls a hierarchical datastore in accordance with some implementations.

FIG. 5 is a block diagram of a device 500 enabled with one or more components for maintaining and controlling a hierarchical datastore in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, one or more input/output (I/O) devices 510, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the data obtainer 210, the data analyzer 220, the hierarchical datastore 230 and the datastore management module 270. In various implementations, the device 500 performs the method 400 shown in FIGS. 4A-4C.

In some implementations, the data obtainer 210 obtains a sensory input that includes sensory input data. To that end, the data obtainer 210 includes instructions 210*a*, and heuristics and metadata 210*b*. In some implementations, the data analyzer 220 determines a data type of the sensory input data. To that end, the data analyzer 220 includes instructions 220*a*, and heuristics and metadata 220*b*. In some implementations, the datastore management module 270 stores the sensory input data in one of the storage hierarchies 240 of the hierarchical datastore 230 based on the data type of the sensory input data. To that end, the datastore management module 270 includes instructions 270*a*, and heuristics and metadata 270*b*.

In some implementations, the one or more I/O devices 510 include a sensor for detecting the sensory input data. In some implementations, the sensor includes an environmental sensor that detects a condition of an environment. In some implementations, the sensor includes an image sensor (e.g., a camera), a depth sensor (e.g., a depth camera), an audio sensor (e.g., a microphone), an olfactory sensor, and/or a tactile sensor. In some implementations, the sensor is a physical sensor. In some implementations, the sensor is a virtual sensor. In some implementations, the one or more I/O devices 510 include a display for displaying a visual representation of the hierarchical datastore 230. In some implementations, the one or more I/O devices 510 include an input device (e.g., a touchscreen, a keyboard, a button, etc.) for receiving queries related to the hierarchical datastore 230.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a non-transitory memory, a sensor and one or more processors coupled with the non-transitory memory and the sensor:
      maintaining a hierarchical datastore for an agent instantiated in a computer-generated reality (CGR) environment, wherein the hierarchical datastore includes a plurality of storage hierarchies including a first storage hierarchy associated with a first data type and a second storage hierarchy associated with a second data type;
      detecting, by a CGR representation of the agent, a sensory input that includes sensory input data;
      determining a type of the sensory input data based on a comparison of the sensory input data with information known to the agent;
      storing a first portion of the sensory input data that is of the first data type in the first storage hierarchy for a first amount of time that is less than a lifetime of the agent; and
      storing a second portion of the sensory input data that is of the second data type in the second storage hierarchy for a second amount of time that is equal to the lifetime of the agent, wherein storing the sensory input data in different storage hierarchies based on the data type reduces the need to store information regarding a relationship between the first data type and the second data type.

2. The method of claim 1, wherein the first data type corresponds to sensor data, and the first portion of the sensory input data is stored in the first storage hierarchy in response to the first portion of the sensory input data being sensor data.

3. The method of claim 1, wherein the second data type corresponds to actions, and the second portion of the sensory input data is stored in the second storage hierarchy in response to the second portion of the sensory input data being an action that can be performed by the CGR representation of the agent.

4. The method of claim 3, wherein the second portion of the sensory input data includes an action that the CGR representation of the agent is scheduled to perform at a future time.

5. The method of claim 1, wherein the second data type corresponds to information that is associated with the agent while the agent exists in the CGR environment.

6. The method of claim 5, wherein the second data type corresponds to facts regarding the CGR environment.

7. The method of claim 5, wherein the second data type corresponds to events that occur in the CGR environment.

8. The method of claim 5, wherein the second data type corresponds to skills, tasks or animations.

9. The method of claim 8, wherein the second storage hierarchy stores events and experiences associated with the CGR representation of the agent.

10. The method of claim 8, wherein the second storage hierarchy stores facts and concepts that are known to the agent.

11. The method of claim 1, wherein the agent accesses one of the plurality of storage hierarchies based on the data type of the information that the agent is searching.

12. The method of claim 1, wherein the agent searches one of the storage hierarchies during a search operation.

13. The method of claim 1, wherein each of the plurality of storage hierarchies includes a set of one or more knowledge frames for storing the sensory input data.

14. The method of claim 13, further comprising: obtaining a particular knowledge frame, and identifying other knowledge frames that are within a similarity threshold of the particular knowledge frame.

15. The method of claim 13, further comprising obtaining a new knowledge frame, identifying a particular storage hierarchy that stores knowledge frames that are within a similarity threshold of the new knowledge frame, and storing the new knowledge frame in that particular storage hierarchy.

16. The method of claim 1, further comprising removing the first portion of the sensory input data stored in the first storage hierarchy.

17. The method of claim 16, further comprising purging the first portion of the sensory input data from the first storage hierarchy after the first portion of the sensory input data has been stored in the first storage hierarchy for the first amount of time.

18. A device comprising:
one or more processors;
a non-transitory memory;
a sensor; and
one or more programs stored in the non-transitory memory, which, when executed by the one or more processors, cause the device to:
maintain a hierarchical datastore for an agent instantiated in a computer-generated reality (CGR) environment, wherein the hierarchical datastore includes a plurality of storage hierarchies including a first storage hierarchy associated with a first data type and a second storage hierarchy associated with a second data type;
detect, by a CGR representation of the agent, a sensory input that includes sensory input data;
determine a type of the sensory input data based on a comparison of the sensory input data with information known to the agent;
in response to the sensory input data being of the first data type, store the sensory input data in the first storage hierarchy for a first amount of time that is less than a lifetime of the agent; and
in response to the sensory input data being of the second data type, store the sensory input data in the second storage hierarchy for a second amount of time that is equal to the lifetime of the agent, wherein storing the sensory input data in different storage hierarchies based on the data type reduces the need to store information regarding a relationship between the first data type and the second data type.

19. A non-transitory memory storing one or more programs, which, when executed by one or more processors of a device, cause the device to:
maintain a hierarchical datastore for an agent instantiated in a computer-generated reality (CGR) environment, wherein the hierarchical datastore includes a plurality of storage hierarchies including a first storage hierarchy associated with a first data type and a second storage hierarchy associated with a second data type;
detect, by a CGR representation of the agent, a sensory input that includes sensory input data;
determine a type of the sensory input data based on a comparison of the sensory input data with information known to the agent;
in response to the sensory input data being of the first data type, store the sensory input data in the first storage hierarchy for a first amount of time that is less than a lifetime of the agent; and
in response to the sensory input data being of the second data type, store the sensory input data in the second storage hierarchy for a second amount of time that is equal to the lifetime of the agent, wherein storing the sensory input data in different storage hierarchies based on the data type reduces the need to store information regarding a relationship between the first data type and the second data type.

\* \* \* \* \*